(12) United States Patent
Matsushita et al.

(10) Patent No.: US 7,979,154 B2
(45) Date of Patent: Jul. 12, 2011

(54) METHOD AND SYSTEM FOR MANAGING SEMICONDUCTOR MANUFACTURING DEVICE

(75) Inventors: Hiroshi Matsushita, Kanagawa (JP); Junji Sugamoto, Oita (JP); Masafumi Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 792 days.

(21) Appl. No.: 11/959,968

(22) Filed: Dec. 19, 2007

(65) Prior Publication Data
US 2008/0147226 A1 Jun. 19, 2008

(30) Foreign Application Priority Data

Dec. 19, 2006 (JP) .................. 2006-340937
Oct. 30, 2007 (JP) .................. 2007-282277

(51) Int. Cl.
*G06F 19/00* (2011.01)
*H01L 21/02* (2006.01)

(52) U.S. Cl. .......... 700/121; 700/109; 700/110; 438/14; 257/E21.525

(58) Field of Classification Search .................. 700/121, 700/51, 110, 109; 438/14, 5; 257/E21.525
See application file for complete search history.

(56) References Cited

U.S. PATENT DOCUMENTS

| 5,607,097 | A * | 3/1997 | Sato et al. ........................ 228/8 |
| 7,221,991 | B2 | 5/2007 | Matsushita et al. |
| 2003/0054573 | A1 * | 3/2003 | Tanaka et al. .................... 438/4 |
| 2004/0230873 | A1 * | 11/2004 | Ward .............................. 714/39 |
| 2005/0194590 | A1 | 9/2005 | Matsushita et al. |
| 2007/0225853 | A1 | 9/2007 | Matsushita et al. |
| 2007/0276528 | A1 | 11/2007 | Matsushita et al. |

FOREIGN PATENT DOCUMENTS
JP 2005-197323 7/2005
* cited by examiner

*Primary Examiner* — Ramesh B Patel
*Assistant Examiner* — Steven R Garland
(74) *Attorney, Agent, or Firm* — Finnegan, Henderson, Farabow, Garrett & Dunner, L.L.P.

(57) ABSTRACT

A management system includes a variable-period setting unit that sets a variable period in which quality-control values vary. Then, a retrieving unit retrieves events sandwiching the variable period. The events can be a maintenance of the semiconductor manufacturing device and/or a change of a correction value. An analysis-period setting unit sets an analysis period for analyzing a cause of variation of the quality-control values between the events retrieved by the retrieving unit.

2 Claims, 9 Drawing Sheets

FIG.4

| EES PARAMETER | CORRELATION COEFFICIENT | ASSOCIATED EVENT DATA |
|---|---|---|
| Y-COMPONENT OF SYNCHRONIZATION ACCURACY | 0.85 | N/A |
| FOLLOW FOCUS | 0.23 | N/A |
| CHAMBER TEMPERATURE | 0.11 | N/A |

FIG.5

| EES PARAMETER | CORRELATION COEFFICIENT | ASSOCIATED EVENT DATA |
|---|---|---|
| LIGHT EXPOSURE | 0.63 | CHANGE OF APC SET VALUE |
| Y-COMPONENT OF SYNCHRONIZATION ACCURACY | 0.42 | N/A |

FIG.6

| EES PARAMETER | CORRELATION COEFFICIENT | ASSOCIATED EVENT DATA |
|---|---|---|
| FOCUS POSITION | 0.96 | MAINTENANCE (ADJUSTMENT OF FOCUS SYSTEM) |
| FOLLOW FOCUS | 0.94 | MAINTENANCE (ADJUSTMENT OF FOCUS SYSTEM) |

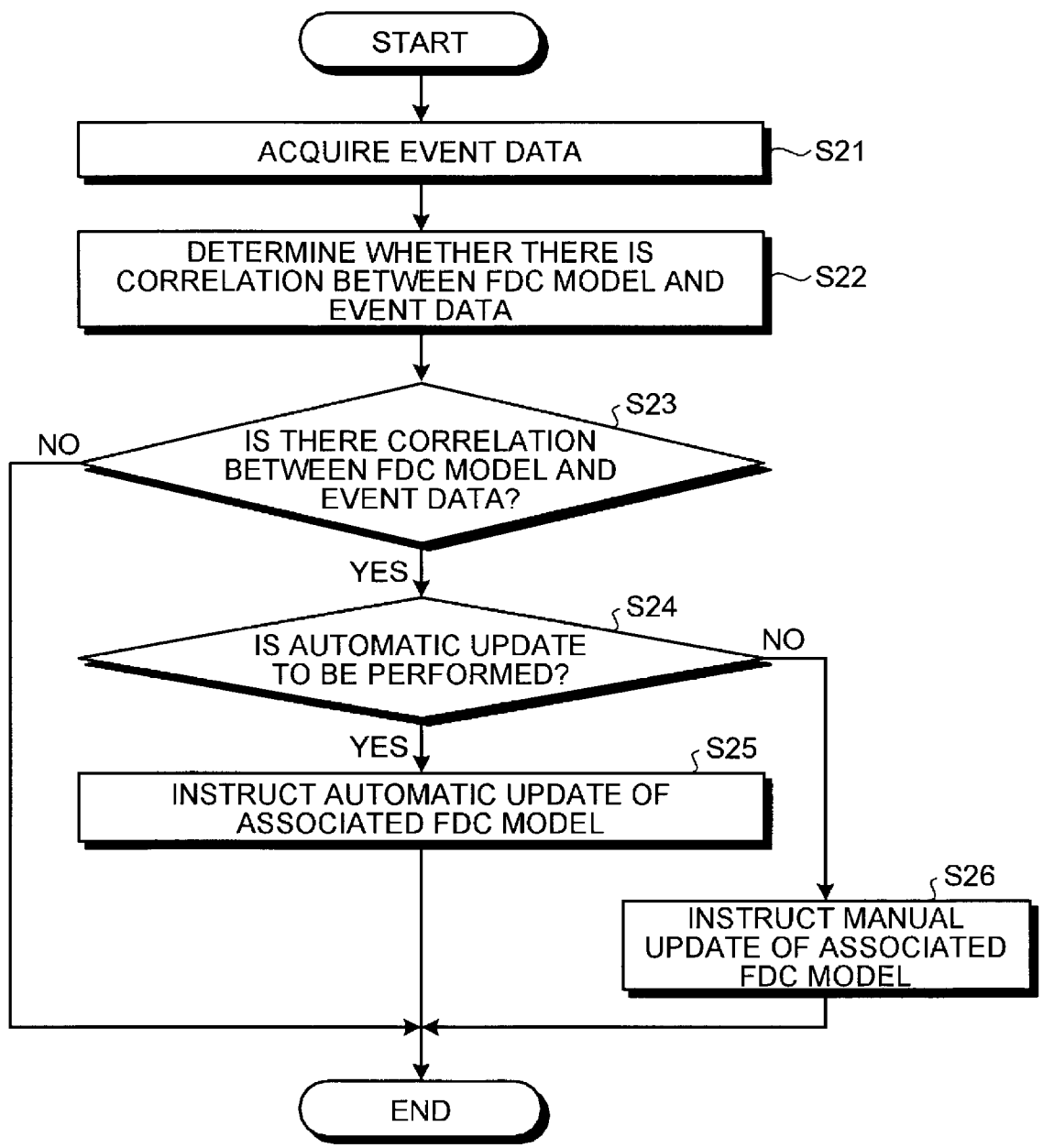

FIG.9

| FDC MODEL NAME | GOOD | | BAD | RUNNING/UPDATING STATE | ASSOCIATED EVENT DATA |
|---|---|---|---|---|---|
| FIRST FDC MODEL | ● | ○ | ○ | RUNNING | |
| SECOND FDC MODEL | ● | ○ | ○ | SUSPENDED, NEED MANUAL UPDATE | MAINTENANCE (ADJUSTMENT OF FOCUS SYSTEM) |

FIG.10

| FDC MODEL NAME | PARTICULARS OF ERROR | ASSOCIATED EVENT DATA | UPDATE TYPE |
|---|---|---|---|
| FIRST FDC MODEL | DIMENSIONAL ERROR | SYNCHRONIZATION ACCURACY | AUTOMATIC |
| SECOND FDC MODEL | DIMENSIONAL ERROR | FOCUS | MANUAL |

AMOUNT OF DIMENSIONAL CHANGE (ABSOLUTE VALUE)

10 nm 5 nm

MEAN OF STANDARD DEVIATION OF Y-COMPONENT OF SYNCHRONIZATION ACCURACY

AMOUNT OF DIMENSIONAL CHANGE (ABSOLUTE VALUE)

5 nm

-0.1 μrad    0    +0.1 μrad

ORTHOGONALITY OF WAFER

FIG.13

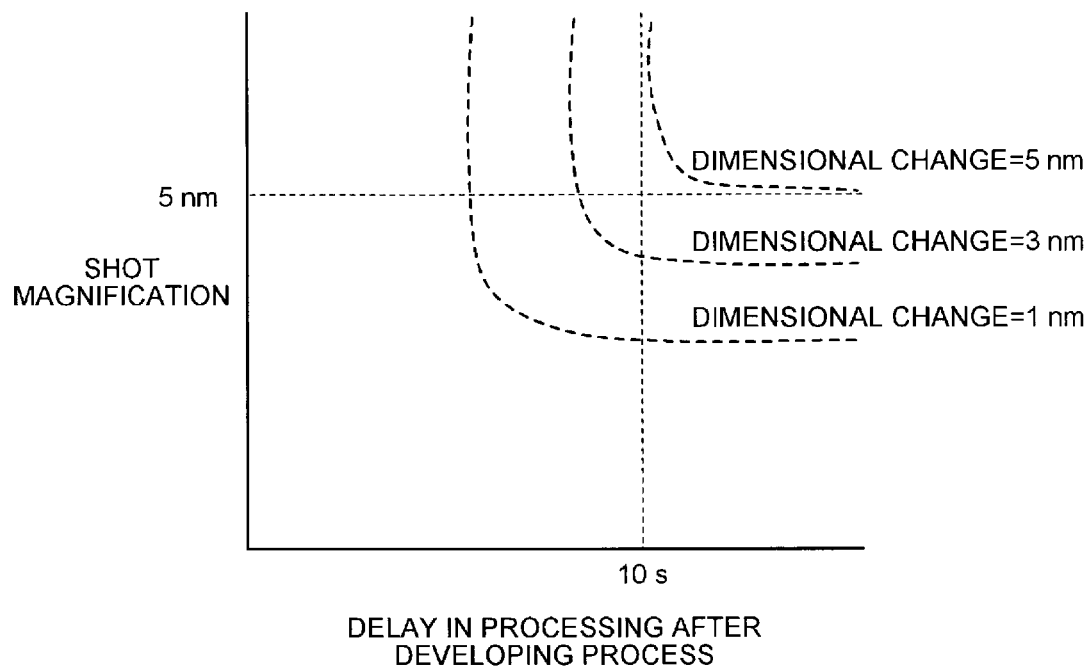

DELAY IN PROCESSING AFTER DEVELOPING PROCESS

FIG.14

| FDC MODEL NAME | EXPOSURE-DEVICE PARAMETER | PROCESS | ERROR DETERMINATION THRESHOLD | MAINTENANCE INSTRUCTION | ASSOCIATED EVENT DATA |
|---|---|---|---|---|---|
| THIRD FDC MODEL | MEAN OF STANDARD DEVIATION OF Y-COMPONENT OF SYNCHRONIZATION ACCURACY | FIRST DISTRIBUTION LAYER | 5 nm | STAGE MECHANISM | SYNCHRONIZATION ACCURACY |
| FOURTH FDC MODEL | ORTHOGONALITY OF WAFER | GATE | 0.1 μrad | STAGE MECHANISM | ADJUSTMENT |
| FIFTH FDC MODEL | SHOT MAGNIFICATION<br><br>DELAY IN PROCESSING AFTER DEVELOPING PROCESS | GATE | 0.1 ppm<br><br>10 s | OPTICAL MECHANISM<br><br>DEVELOPING UNIT | ADJUSTMENT<br><br>CLEAN TRACK |

METHOD AND SYSTEM FOR MANAGING SEMICONDUCTOR MANUFACTURING DEVICE

CROSS-REFERENCE TO RELATED APPLICATIONS

This application is based upon and claims the benefit of priority from the prior Japanese Patent Application No. 2006-340937, filed on Dec. 19, 2006 and Japanese Patent Application No. 2007-282277, filed on Oct. 30, 2007; the entire contents of both of which are incorporated herein by reference.

BACKGROUND OF THE INVENTION

1. Field of the Invention

The present invention relates to a technology for managing a semiconductor manufacturing device.

2. Description of the Related Art

Better results can be obtained in a semiconductor manufacturing process if target parameters of a process are maintained at respective predetermined target values. For example, in a process of laminating a film, it is necessary to laminate a film with a desired width previously designed in the production recipe. Furthermore, in an exposure process, it is necessary that the dimensions after the exposure process are within an allowable range of the design values.

However, in semiconductor manufacturing processes, one or more target parameters may deviate from the target values due to various external causes. For example, in the exposure process, light exposure may change depending on a state of a lighting optical system or a state of a reticle that transfers a circuit pattern. Such a change of light exposure can cause dimensional change of a semiconductor. If the target parameters vary, elements that make up a semiconductor integrated circuit (IC) do not work in a desirable manner. Such a semiconductor IC is considered as a defective product and cannot be sold in the marketplace, resulting in decreasing a production yield.

One approach is to monitor a target parameter, i.e., a quality control (QC) value, for each process. Such monitoring includes monitoring a physical quantity, i.e., a QC value, while a process is being executed. Examples of QC values include resist width in the exposure process and finished dimensions of an element manufactured through a processing process.

It is common to monitor an internal state, so-called an equipment engineering system (EES) data, of the semiconductor manufacturing device by using various sensors. For example, in an exposure device used in the exposure process, several hundreds of EES parameters, such as light exposure, focus value, and temperature of a developer, are acquired.

JP-A 2005-197323 (KOKAI), discloses a conventional technology for identifying a cause of a variation of a QC value in a semiconductor manufacturing device from EES parameters by performing a correlation analysis on the QC value and the EES parameters.

Recently, an advanced process control (APC) has been developed. In the APC, a state of a manufacturing device is controlled based on a value of the target parameter to maintain a target parameter to a predetermined value. For example, in the exposure process, light exposure of the exposure device is controlled so that a resist width is maintained to a predetermined value based on the values of the resist width measured as the QC values. A linear relation can be seen between the light exposure and the resist width. Therefore, if it is detected a tendency from the QC values that the resist width become excessively wide, light exposure is controlled so that the resist width reduces to a desired value.

A fault detection and classification (FDC) is performed based on the EES parameters. FDC is a method of monitoring a parameter, such as an EES parameter, to check occurrence of a defect, and classify the defect when a defect has occurred. In the FDC, it is determined that a known defect has occurred when certain EES parameters have values in a predetermined range. In other words, in the FDC, it is necessary to prepare an FDC model for detecting defects based on EES parameters.

Maintenance operations are often performed on the semiconductor manufacturing device to maintain the device in a normal state. The maintenance operation includes, for example, cleaning of a vacuum chamber, or adjustment of various units. Although the semiconductor manufacturing device is maintained in a normal state by such maintenance operation, some of the EES parameters may vary unexpectedly due to the maintenance operation.

In the technique of identifying a cause of the change in QC values by using EES parameters, if the state of the device changes because an APC control or a maintenance operation is performed during an analysis period, the true cause of the change can not be extracted. Moreover, if the state of the device changes because an APC control or a maintenance operation is performed, the FDC model needs to be updated to suit the current state of the device. In other words, if one FDC model is used before and after an APC control or a maintenance operation, there is a possibility that a defect is erroneously detected or even overlooked.

SUMMARY OF THE INVENTION

According to an aspect of the present invention, there is provided a management system that manages a semiconductor manufacturing device. The management system includes a first storage unit that stores therein a plurality of quality-control values, the quality-control values being values obtained by measuring a dimension of wafers at different times during processing of the wafers by the semiconductor manufacturing device; a second storage unit that stores therein a plurality of equipment parameters, the equipment parameters being values obtained by monitoring a state of the semiconductor manufacturing device at different times during processing of the wafers by the semiconductor manufacturing device; a third storage unit that stores therein a maintenance log of the semiconductor manufacturing device; a first setting unit that sets a correction value for correcting the equipment parameters to control the quality-control values based on the quality-control values in the first storage unit and the equipment parameters in the second storage unit; a fourth storage unit that stores therein the correction value set by the first setting unit; a second setting unit that sets a variable period in which the quality-control values vary; a retrieving unit that retrieves events sandwiching the variable period, the events including a maintenance of the semiconductor manufacturing device from the maintenance log stored in the third storage unit and a change of the correction value in the fourth storage unit; a third setting unit that sets an analysis period for analyzing a cause of variation of the quality-control values between the events retrieved by the retrieving unit; and an extracting unit that performs statistical analysis to quantitatively calculate a correlation between quality-control values and equipment parameters within the analysis period, and extracts a cause of variation of the quality-control values based on calculated correlation.

According to another aspect of the present invention, there is provided a method of managing a semiconductor manufacturing device. The method includes setting a variable period in which quality-control values vary, the quality-control values being values obtained by measuring a dimension of wafers at different times during processing of the wafers by the semiconductor manufacturing device; retrieving events sandwiching the variable period, the events including a maintenance of the semiconductor manufacturing device and a change of a correction value, the correction value being a value for correcting equipment parameters to control the quality-control values based on the quality-control values, the equipment parameters being values obtained by monitoring a state of the semiconductor manufacturing device at different times during processing of the wafers by the semiconductor manufacturing device; setting an analysis period for analyzing a cause of variation of the quality-control values between the events retrieved at the retrieving; performing statistical analysis to quantitatively calculate a correlation between quality-control values and equipment parameters within the analysis period; and extracting a cause of variation of the quality-control values based on the correlation calculated at the performing.

According to still another aspect of the present invention, there is provided a management system that manages a semiconductor manufacturing device. The management system includes a first storage unit that stores therein a plurality of quality-control values, the quality-control values being values obtained by measuring a dimension of wafers at different times during processing of the wafers by the semiconductor manufacturing device; a second storage unit that stores therein a plurality of equipment parameters, the equipment parameters being values obtained by monitoring a state of the semiconductor manufacturing device at different times during processing of the wafers by the semiconductor manufacturing device; a third storage unit that stores therein a maintenance log of the semiconductor manufacturing device; a first setting unit that sets a correction value for correcting the equipment parameters to control the quality-control values based on the quality-control values in the first storage unit and the equipment parameters in the second storage unit; a fourth storage unit that stores therein the correction value set by the first setting unit; a detecting unit that detects an abnormality in the state of the semiconductor manufacturing device based on monitoring of the equipment parameters and an error detection rule, the error detection rule is for determining an abnormality in the state of the semiconductor manufacturing device; an acquiring unit that acquires events from the third storage unit and the fourth storage unit, the events including a maintenance of the semiconductor manufacturing device stored in the third storage unit and a change of the correction value stored in the fourth storage unit; a determining unit that determines whether the events acquired by the second acquiring unit are associated with the equipment parameters monitored by the detecting unit; and an instructing unit that outputs an instruction indicative of a necessity to update the error detection rule when it is determined by the determining unit that the events are associated with the equipment parameters.

According to still another aspect of the present invention, there is provided a method of managing a semiconductor manufacturing device. The method including acquiring events, the events including a maintenance of the semiconductor manufacturing device and a change of a correction value, the correction value being a value for correcting equipment parameters to control quality-control values based on the quality-control values, the equipment parameters being values obtained by monitoring a state of the semiconductor manufacturing device at different times during processing of wafers by the semiconductor manufacturing device, the quality-control values being values obtained by measuring a dimension of the wafers at different times during processing of the wafers by the semiconductor manufacturing device; determining whether the events acquired at the acquiring are associated with the equipment parameters being monitored by a detecting unit that detects an abnormality in the state of the semiconductor manufacturing device based on monitoring of the equipment parameters and an error detection rule, the error detection rule is for determining an abnormality in the state of the semiconductor manufacturing device; and outputting an instruction indicative of a necessity to update the error detection rule when it is determined at the determining that the events acquired at the acquiring are associated with the equipment parameters monitored by the detecting unit.

BRIEF DESCRIPTION OF THE DRAWINGS

FIGS. 4 to 6 are examples of display of EES parameters, correlation coefficient, and associated event data on a display unit of a user interface (I/F) shown in FIG. 1;

FIG. 8 is a flowchart of a process of managing the semiconductor manufacturing device performed by the management system shown in FIG. 7;

FIG. 9 is an example of display of an error detection state for each FDC model;

FIG. 10 is an example of a table containing event data associated with an FDC model;

FIG. 13 is a graph for explaining a relation among delay in a processing after a developing process, shot magnification, and amount of dimensional change (absolute value); and FIG. 14 depicts examples of FDC models according to a third embodiment of the present invention.

DETAILED DESCRIPTION OF THE INVENTION

Exemplary embodiments of the present invention are explained in detail below with reference to the accompanying drawings.

The following embodiments include acquiring data about APC and maintenance as event data in a system in which target parameters for each process are controlled so as to be constant by performing APC during a semiconductor manufacturing process. Then, extraction of a cause of change in the state of the semiconductor manufacturing device, or updating of an FDC model during an interval between events is performed by using the event data as a trigger.

In the embodiments explained below, the present invention is applied to an exposure process as a manufacturing process of a semiconductor IC. However, the present invention can be applied to other processes in the manufacturing process.

The first embodiment, data on an APC control and maintenance are acquired as event data from a semiconductor manufacturing device that is controlled by APC, and a period for analyzing a cause of variation of QC values is set based on event occurrence time. Moreover, an FDC model is updated based on occurrence of events as a trigger.

An exposure process for exposing a gate of a transistor is described in the first embodiment.

Figure 1:
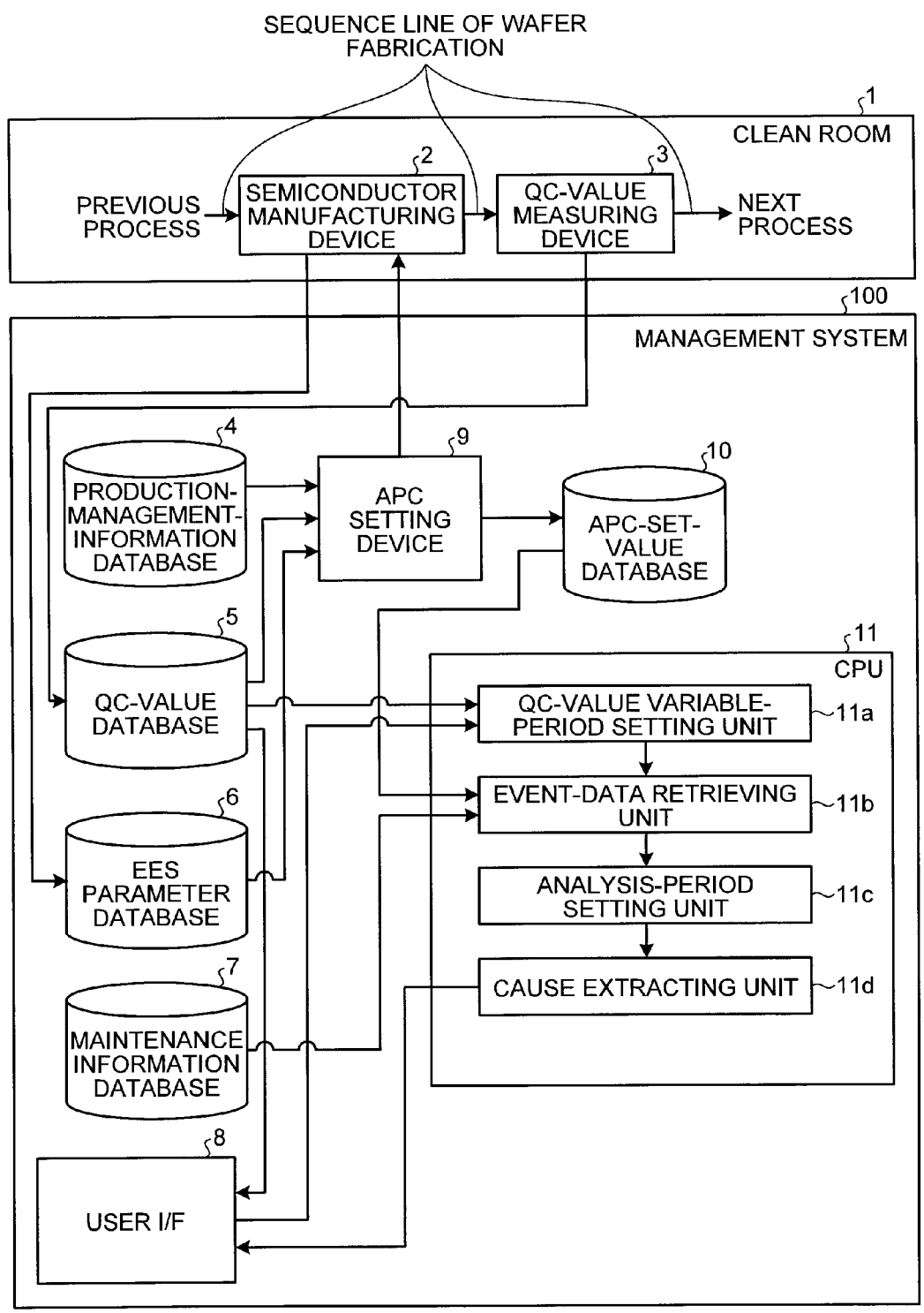
FIG. 1 is a block diagram of a management system for managing a semiconductor manufacturing device according to a first embodiment of the present invention.

FIG. 1 is a block diagram of a management system 100 according to the first embodiment for managing a semiconductor manufacturing device 2.

The semiconductor manufacturing device (e.g., an exposure device) 2 and a QC-value measuring device 3 are accommodated in a clean room 1 and the atmosphere in the control room 1 is controlled accurately.

The semiconductor manufacturing device 2 receives a wafer that has been subjected to a previous process, and it further processes that wafer. A resist coating process is an example of the previous process, and an exposure process is an example of the process performed by the semiconductor manufacturing device 2.

The QC-value measuring device 3 measures QC values of the wafer, which has been processed by the semiconductor manufacturing device 2, and passes that wafer to a next device for a next process. Resist width of a gate portion of a transistor is an example of the QC value. Etching process is an example of the next process. The QC-value measuring device 3 is, for example, a critical dimension scanning electron microscope (SEM).

The semiconductor manufacturing device 2 is controlled by APC. The management system 100 manages the semiconductor manufacturing device 2. The management system 100 includes various databases such as a production-management-information database 4, a QC-value database 5, an EES parameter database 6, and a maintenance information database 7.

The production-management-information database 4 contains production management information for identifying each of the wafers processed by the semiconductor manufacturing device 2. The QC-value database 5 serves as a first storage unit and contains QC values obtained by measuring dimension of a processed area of each of the wafers processed by the semiconductor manufacturing device 2. The EES parameter database 6 serves as a second storage unit and contains EES parameters obtained by monitoring the state of the semiconductor manufacturing device 2. The maintenance information database 7 serves as a third storage unit and contains maintenance log of the semiconductor manufacturing device 2.

Data is input in each of the databases 5 to 7 from a data collection server (not shown).

The production management information is for identifying which lot (wafer) is being processed by the semiconductor manufacturing device 2, and contains lot (wafer) number, brand name, process name, processing date/time, and the like.

An example of the QC values includes a resist width (dimension of a processed area) of a gate of a transistor exposed in the exposure process.

The EES parameters are various data acquired by sensors (not shown) provided in each unit of the semiconductor manufacturing device 2, and they are the keys to know the internal state of the semiconductor manufacturing device 2. In a typical semiconductor manufacturing device, it is possible to collect about 200 types of the EES parameters such as actual light exposure, follow focus capability, synchronization accuracy, chamber temperature, chamber pressure, and inclination of axis.

Maintenance information is a log data indicating when and what type of maintenance operation was performed on the semiconductor manufacturing device 2. The maintenance information contains data on maintenance target device, maintenance time, particulars of maintenance, and the like.

The management system 100 also includes a user interface (I/F) 8 and an APC setting device 9. The user I/F 8 displays various data on a display unit (not shown) and outputs various control signals in response to operations by an operator of the management system 100. The APC setting device 9 serves as a first setting unit and generates an APC set value (a correction value) that is used for correcting an EES parameter to control the QC values based on the production management information, the distribution of the QC values, and the EES parameters.

The QC values stored in the QC-value database 5 are displayed in the form of a time-series graph on the display unit of the user I/F 8.

The APC setting device 9 acquires an EES parameter, such as actual light exposure in the exposure process, and predicts a QC value for a target lot based on QC values of past five lots. The APC setting device 9 then calculates an APC set value corresponding to the acquired EES parameter (light exposure) based on the predicted QC value to achieve a desired resist width, and outputs the calculated APC set value to the semiconductor manufacturing device 2. The semiconductor manufacturing device 2 uses the APC set value received from the APC setting device 9 in the exposure process for the target lot. The APC set value is calculated by using a table containing items of previously measured actual EES parameter (light exposure) in association with a QC value (resist width).

The management system 100 also includes an APC-set-value database 10 and a computer (central processing unit (CPU)) 11. The APC-set-value database 10 serves as a fourth storage unit and contains an APC set value generated by the APC setting device 9. The CPU 11 outputs information in response to a control signal received from the user I/F 8. The databases 4 to 7 and 10 can be realized by using a magnetic disk or other computer-readable recording media.

The CPU 11 includes a QC-value variable-period setting unit 11a, an event-data retrieving unit 11b, an analysis-period setting unit 11c, and a cause extracting unit 11d. The QC-value variable-period setting unit 11a serves as a second setting unit and sets a QC-value variable period in which a QC values varies based on the QC values and a control signal received from the user I/F 8. The event-data retrieving unit 11b searches the maintenance information database 7 and the APC-set-value database 10, and retrieves events, such as maintenance of the semiconductor manufacturing device 2, or change in the APC set value, that took place just before/after the QC-value variable period.

Examples of the event data include time at which the APC set value was changed, or time at which a maintenance operation was conducted.

The analysis-period setting unit 11c serves as a third setting unit and sets a period between the retrieved events that sandwich the QC-value variable period as an analysis period. The cause extracting unit 11d performs correlation analysis between the QC values and the EES parameters during the analysis period, and outputs the calculated correlation coefficient in association with the EES parameter to which the correlation analysis has been conducted to the user I/F 8. The user I/F 8 displays the correlation coefficient in association with the EES parameter on the display unit.

Figure 2:
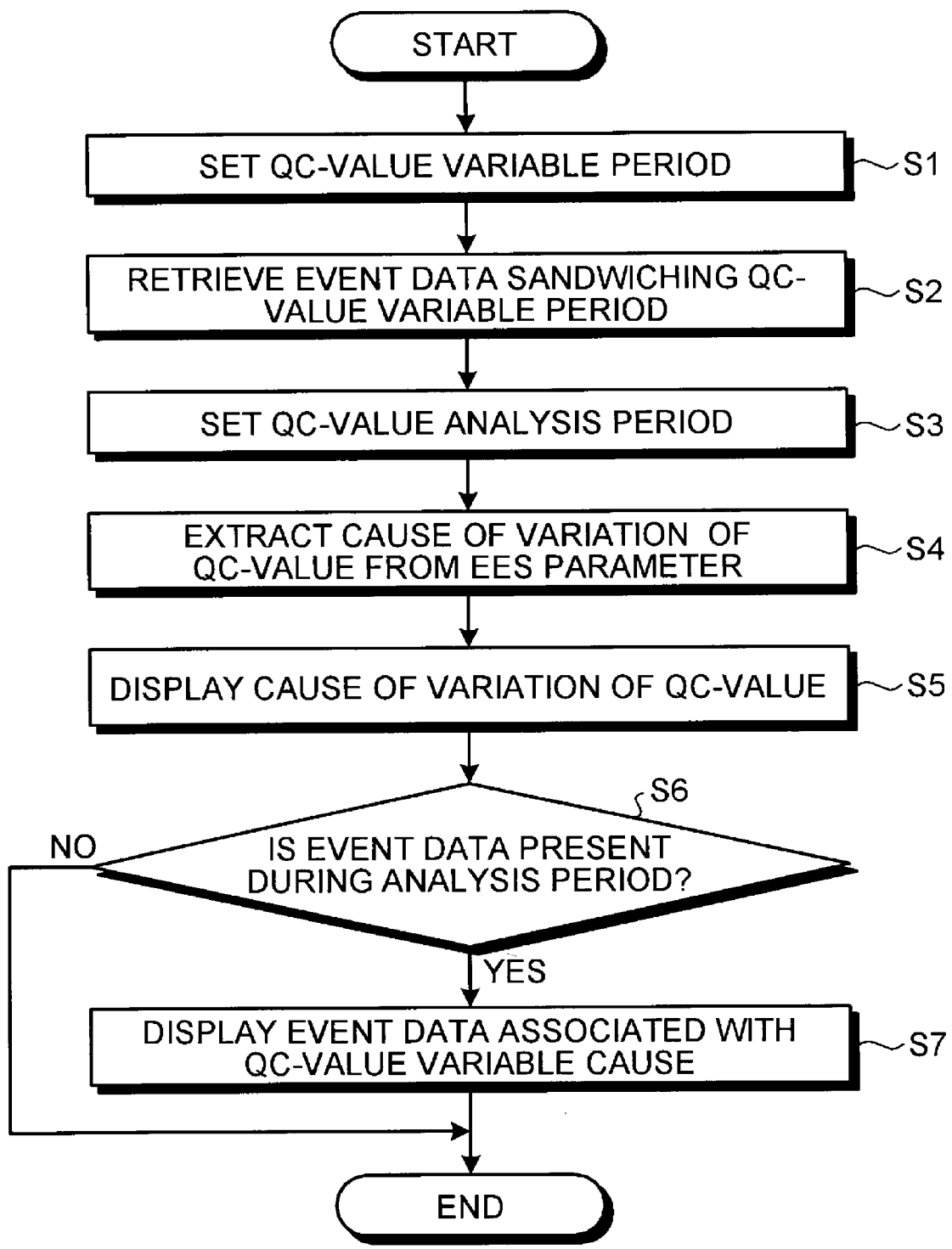
FIG. 2 is a flowchart of a process of managing the semiconductor manufacturing device performed by the management system shown in FIG. 1.

FIG. 2 is a flowchart of a process of managing performed by the management system 100 when managing the semiconductor manufacturing device 2. To begin with, the QC-value variable-period setting unit 11a sets a QC-value variable period based on the QC values present in the QC value database 5 and a control signal received from the user I/F 8 (step S1).

The event-data retrieving unit 11b retrieves event data sandwiching the QC-value variable period (step S2). The event data is information on events such as a maintenance or a change of an APC set value. Information on whether a maintenance was performed can be obtained by searching the maintenance information database 7, and information on whether an APC set value was changed can be obtained by searching the APC-set-value database 10. The events sandwiching the QC-value variable period are a pre-event that occurred immediately before a start of the QC-value variable period and a post-event that occurred immediately after an end of the QC-value variable period.

The analysis-period setting unit 11c sets an analysis period (step S3). The analysis period starts from a time point at which the pre-event occurred and ends at a time point at which the post-event occurred. In other words, the analysis period includes the QC-value variable period.

The cause extracting unit 11d performs a correlation analysis between the QC values and the EES parameters during the analysis period, and identifies an EES parameter having a correlation coefficient larger than a predetermined target value as a cause of variation of the QC-values (step S4).

The cause extracting unit 11d outputs the calculated correlation coefficient associated with the EES parameter to the user I/F 8, and the user I/F 8 displays them on the display unit (step S5). Thus, the operator can understand the cause of variation of the QC values by looking at the information displayed on the display unit.

The event-data retrieving unit 11b determines whether event data related to the EES parameter is present during the analysis period (step S6). Whether event data during the analysis period is present can be decided by searching the maintenance information database 7 and the APC-set-value database 10. When such an event data is present, the CPU 11 outputs the event data to the user I/F 8, so that the user I/F 8 displays that event data in associated manner with the cause of variation of the QC values (step S7). On the other hand, when there is no such event data, the process control ends.

With the operation described above, it is possible to retrieve a true cause of variation of the QC values excluding a cause of variation due to events.

Figure 3A:
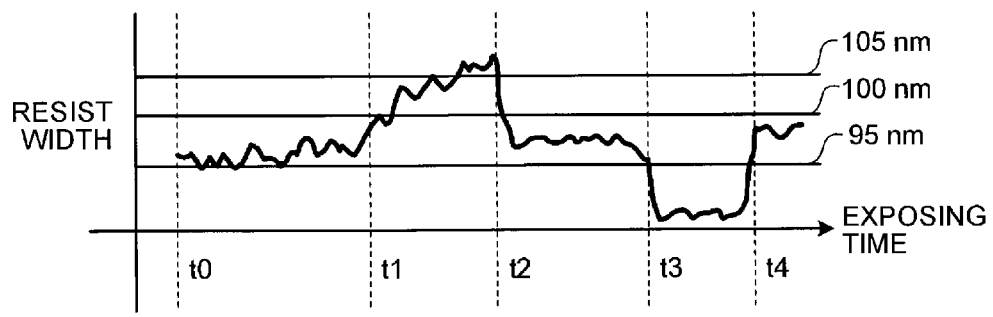
FIG. 3A is a graph of a relation between exposing time and resist width as a QC value.
Figure 3B:
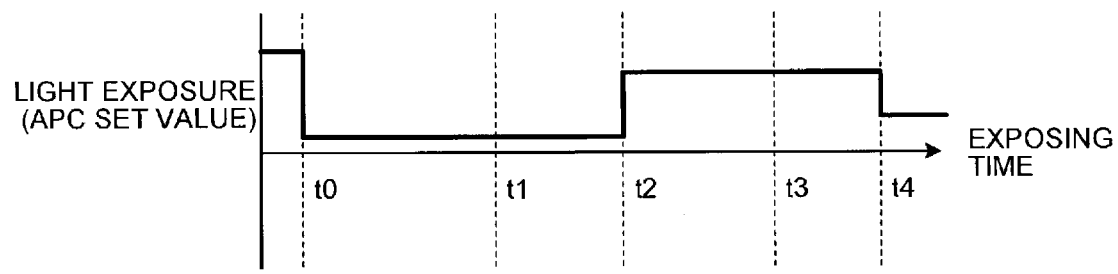
FIG. 3B is a graph of a relation between exposing time and light exposure as an APC set value.
Figure 3C:
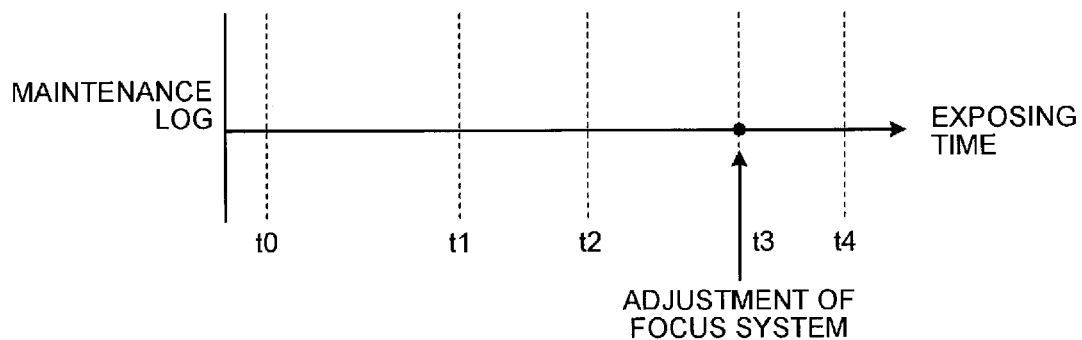
FIG. 3C is a graph of a relation between exposing time and maintenance log.

FIG. 3A is a graph of a relation between an exposing time and a resist width as a QC value; FIG. 3B is a graph of a relation between an exposing time and light exposure as an APC set value; and FIG. 3C is a graph of a relation between an exposing time and a maintenance log according to the first embodiment.

The graph shown in FIG. 3A is displayed on the display unit of the user I/F 8 in accordance with output of data from the QC-value database 5. The resist width shown in FIG. 3A is a measured value of a resist width of a transistor gate processed in the exposure process. For example, five points are selected per wafer, their widths are measured, and a mean of measured width is plotted as the resist width for each wafer. Each resist width measured at each exposure process time is sequentially plotted as a point along the horizontal axis (exposing time), and those points are connected by a line.

In the example shown in FIG. 3A, a desired resist width is 100 nanometers, and an allowable range of the resist width is from 95 nanometers to 105 nanometers. It can be seen from FIG. 3A that the resist width increased after time t1, and exceeded the allowable range.

The APC setting device 9 predicts that the resist width of the subsequent lots is likely to increase based on the fact that the resist width (QC value) is increasing at time t2. Accordingly, the APC setting device 9 makes a correction to increase the light exposure (one of the EES parameters) to control the resist width to be the desired value (i.e., the APC set value is set) (see FIG. 3B). As a result, the resist width is controlled to the desired value, i.e., within the allowable range.

At time t3, an engineer conducts a maintenance operation on the semiconductor manufacturing device 2. For example, the engineer adjusts a focus system of the semiconductor manufacturing device 2 (see FIG. 3C). As a result, focus value changes, making the resist width thinner than the desired value.

At time t4 until which a thin resist width has been continued for five lots or more, the APC setting device 9 decreases the light exposure (see FIG. 3B) to control the resist width to be the desired value. As a result, the resist width increases and it is near the desired value.

Because dimension of a transistor gate largely affects the characteristics of the transistor, it is preferable to maintain the resist width at the desired value.

It is examined below why dimensional change occurs from time t1 to time t2 as shown in FIG. 3A.

An operation for extracting EES parameters that could be the cause for the dimensional change is performed. A defected portion of the exposure device that is the cause of the dimensional change is identified from the extracted EES parameters.

Then, a correlation analysis is performed for extracting a cause of variation of the dimensional change. A correlation coefficient R between the resist width (QC value) and each of the EES parameters can be obtained from Equation (1):

$$R = \frac{1}{n} \frac{\sum_i (x_i - \mu_x)(y_i - \mu_y)}{\sqrt{\left(\frac{\sum_i x_i^2}{n} - \mu_x^2\right)} \sqrt{\left(\frac{\sum_i y_i^2}{n} - \mu_y^2\right)}} \quad (1)$$

A mean of measured five points per wafer is used. In Equation (1), $x_i$ is a value of the EES parameter of i-th wafer, $y_i$ is the QC value of the i-th wafer, $\mu_x$ is a mean of $x_i$, $\mu_y$ is a mean of $y_i$, and $n$ is the total number of wafers. Specifically, $x_i$ and $y_i$ are means for each wafer, while $\mu_x$ and $\mu_y$ are means of the n numbers of wafers.

An EES parameter having a correlation coefficient R obtained from Equation (1) equal to or larger than 0.6 is extracted as an EES parameter related to the change of the resist width (QC value).

In such a correlation analysis, where the analysis period is taken affects the result.

Specifically, if the correlation analysis is performed for the entire period, it is difficult to extract the cause of variation; because, an EES parameter having strong correlation with the dimensional value may be different for each period.

For example, at time t2 and time t4 shown in FIG. 3A, the light exposure controlled by the APC setting device 9 will be extracted as the EES parameter as such having strong correlation with the dimensional change as shown in FIG. 3B. On the other hand, at time t3, the focus value that has been changed due to a maintenance operation will be extracted as the most related EES parameter as shown in FIG. 3C.

As can be seen from FIGS. 3A to 3C, there is no common EES parameter having correlation with the dimensional value for the entire period. Therefore, if the correlation analysis is performed for the entire period, no EES parameter will be extracted.

According to the first embodiment, an operator specifies (step S1 in FIG. 2) a variation for which the cause is to be extracted. For example, the operator can point the variation for which the cause is to be extracted on the graph FIG. 3A that is displayed on the display unit of the user I/F 8.

For example, if the operator specifies a portion (period) between times t1 and t2, where the resist width is increasing, in a graph shown in FIG. 3A, the event-data retrieving unit 11b retrieves event data sandwiching the specified period (step S2 in FIG. 2). As described above, the event data contains time at which the APC setting device 9 changes an APC set value and time when the maintenance operation is performed.

In the examples shown FIGS. 3A to 3C, the event-data retrieving unit 11b retrieves that the APC setting device 9 has changed the APC set value at times t0 and t2 (see FIG. 3B). The analysis-period setting unit 11c then sets the analysis period between times t0 and t2 (step S3 in FIG. 2). The analysis period is set between the events sandwiching the period in which the target dimensional change occurs. Furthermore, it is preferable to set the analysis period as long as possible unless the analysis period includes extracted events from a view of correlation analysis.

The cause extracting unit 11d then acquires the QC values and the EES parameters from each database for the set analysis period, and calculates a correlation coefficient from Equation (1) (step S4 in FIG. 2).

FIGS. 4 to 6 are examples of EES parameters, correlation coefficients, and associated event data that are displayed on the display unit of the user I/F 8.

As shown in FIG. 4, a result of extraction of a cause of variation of the QC values is displayed on the display unit, indicating that Y-component of synchronization accuracy has the largest correlation coefficient of 0.85. As a result, the operator can decide that the Y-component of the synchronization accuracy is the cause of variation for the analysis period (step S5 in FIG. 2).

As described above, the operator can find a true cause of variation excluding a cause of variation due to events; because, such analysis period is set in such a manner that events sandwiching the analysis period are automatically retrieved. Thus, it is possible to better manage the semiconductor manufacturing device 2 based on the true cause.

When the operator specifies time t2 or time t3 shown in FIG. 3A, events sandwiching a period where the QC values vary are retrieved, and a correlation analysis is performed in the same manner.

For example, assume now that the operator specifies a period including time t2 but not including time t1 and time t3. As shown in FIG. 3B, facts that the APC setting is changed at time t0 and time t2 and a maintenance operation is performed at time t3 are extracted as events, and the analysis period is set between time t0 and time t3.

As shown in FIG. 5, a result of extraction of a cause of variation of the QC values, and event data at time t2 as event data present during the analysis period are displayed on the display unit of the user I/F 8. Assume now that a table (not shown) containing event data in association with the EES parameter is provided, e.g., the EES parameter name associated with light exposure is also associated with an event indicative of change in the APC set value. At this point, if there is association between the event data and the target EES parameter in the table (not shown), the cause extracting unit 11d displays associated event data on the display unit of the user I/F 8 (steps S6 and S7 in FIG. 2).

When the operator specifies time t3 shown in FIG. 3A, maintenance data of a focus system is displayed as the event data at time t3 in the similar manner as shown in FIG. 6.

As described above, if the event data is displayed in addition to the EES parameter as shown in FIGS. 5 and 6, the operator can find out that the dimensional change is caused by extracted known events.

Instead of the operator setting the QC-value variable period, the QC-value variable period can be set automatically. For example, it is possible to previously set a threshold, and automatically extract a period where the level of a change of the QC values exceeds the threshold as the QC-value variable period. In this case, the QC-value variable-period setting unit 11a can automatically set the QC-value variable period without the need for any instruction from the operator via the user I/F 8.

As described above, according to the first embodiment, when analyzing the cause of variation of the QC values from the EES parameter, event data sandwiching the QC-value variable period is automatically retrieved, and the analysis period is set between the retrieved events. As a result, it is possible to extract a true cause of variation of the QC values excluding a cause of variation due to events. Furthermore, an event occurs during the QC-value variable period, it is possible to identify that the event has caused a change of the QC values by examining association between the event and the EES parameter. Thus, it is possible to detect an error depending on events, such as the APC control or the maintenance operation, during a semiconductor manufacturing process.

The cause of variation of the QC values is identified based on a correlation coefficient calculated from Equation (1) between the QC values and the EES parameters. However, if it is possible to quantitatively calculate a correlation between change of the QC values and the EES parameter, a calculation method is not limited to the correlation analysis and other statistical analysis or statistical method can be used. For example, a partial least square (PLS) analysis, or a principal component analysis can be used to calculate the correlation. Furthermore, an EES parameter as a cause of variation is extracted by using a univariate correlation analysis. Specifically, it is assumed that a change of the QC values occurs due to a single EES parameter. However, there is a possibility that the QC values vary due to a plurality of EES parameters. In this situation, it is possible to use a multivariate analysis instead of the univariate analysis.

A second embodiment of the present invention is described below. Particularly, a semiconductor manufacturing device according to the second embodiment is controlled by APC, data on an APC control and maintenance are acquired as event data, and an FDC model is updated based on occurrence of events as a trigger.

Figure 7:
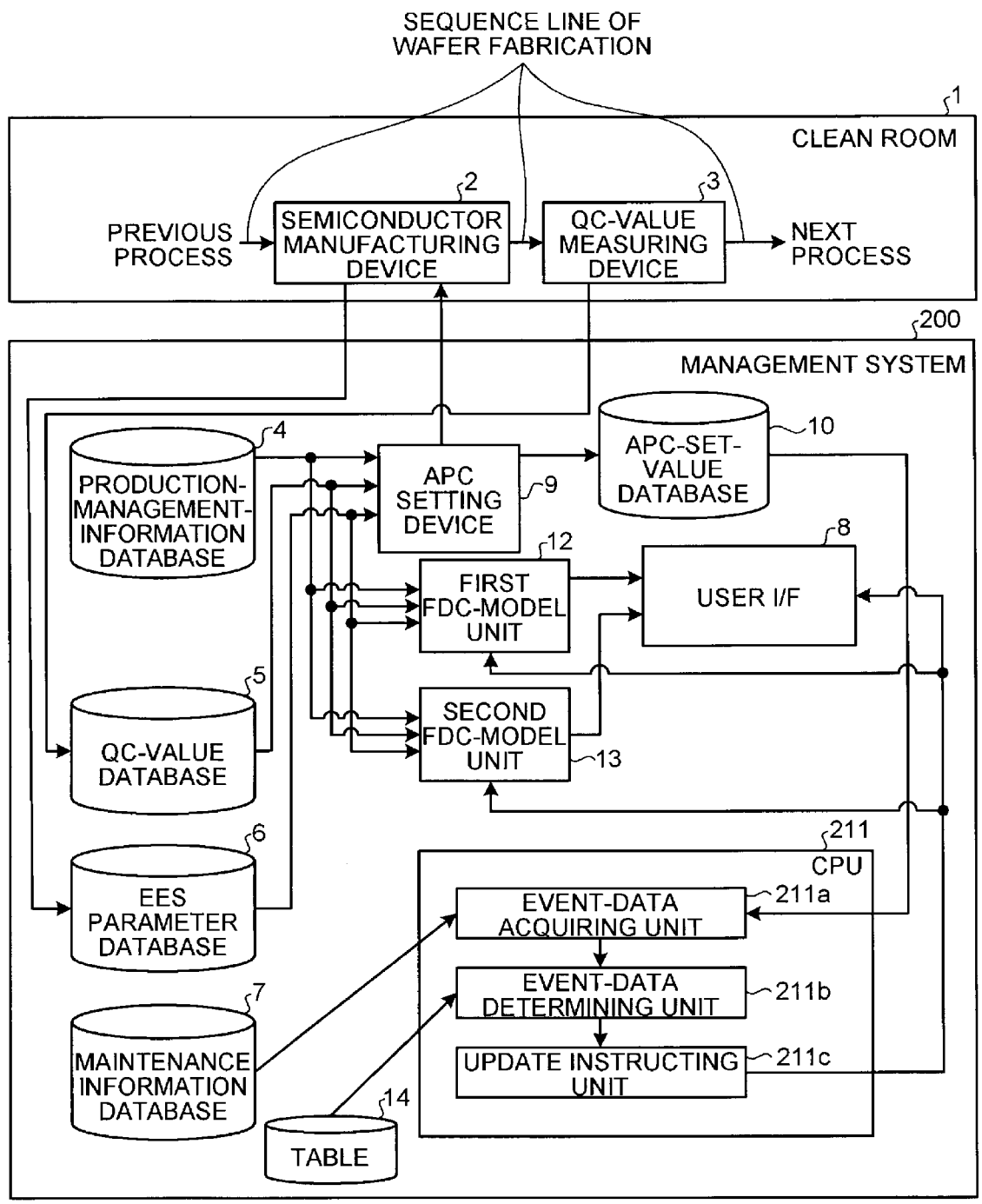
FIG. 7 is a block diagram of a management system for managing a semiconductor manufacturing device according to a second embodiment of the present invention.

FIG. 7 is a block diagram of a management system 200 according to the second embodiment for managing the semiconductor manufacturing device 2. Components assigned with the same reference numbers as those shown in FIG. 1 are configured similarly to those described in the first embodiment.

The semiconductor manufacturing device 2 is controlled by APC. The management system 200 manages the semiconductor manufacturing device 2. The management system 200 includes various databases such as the production-management-information database 4, the QC-value database 5, the EES parameter database 6, and the maintenance information database 7.

The production-management-information database 4 contains production management information for identifying each of the wafers processed by the semiconductor manufacturing device 2. The QC-value database 5 serves as a first storage unit and contains QC values obtained by measuring dimension of a processed area of each of the wafers processed by the semiconductor manufacturing device 2. The EES parameter database 6 serves as a second storage unit and contains EES parameters obtained by monitoring the state of the semiconductor manufacturing device 2. The maintenance information database 7 serves as a third storage unit and contains maintenance log of the semiconductor manufacturing device 2.

Data is input in each of the databases 5 to 7 from a data collection server (not shown).

The management system 200 also includes the user I/F 8 and the APC setting device 9. The user I/F 8 displays various data on a display unit (not shown) and outputs various control signals in response to operations by an operator of the management system 100. The APC setting device 9 serves as a first setting unit and generates an APC set value (a correction value) that is used for correcting an EES parameter to control the QC values based on the production management information, the distribution of the QC values, and the EES parameters.

The management system 200 also includes the APC-set-value database 10, a first FDC-model unit 12, and a second FDC-model unit 13. The APC-set-value database 10 serves as the fourth storage unit and contains an APC set value generated by the APC setting device 9. The first FDC-model unit 12 serves as a first device-error detecting unit, while the second FDC-model unit 13 serves as a second device-error detecting unit.

The first FDC-model unit 12 monitors a value of a first EES parameter stored in the EES parameter database 6, detects an abnormality of the semiconductor manufacturing device 2 based on a first FDC model as a first error-detection rule for determining an error of the semiconductor manufacturing device 2. When an abnormality of the semiconductor manufacturing device 2 is detected, the first FDC-model unit 12 outputs information on the detected abnormality to the user I/F 8 so that the display unit of the user I/F 8 displays that information.

The second FDC-model unit 13 monitors a value of a second EES parameter stored in the EES parameter database 6, detects an abnormality of the semiconductor manufacturing device 2 based on a second FDC model as a second error-detection rule for determining an error of the semiconductor manufacturing device 2. When an abnormality of the semiconductor manufacturing device 2 is detected, the second FDC-model unit 13 outputs information on the detected abnormality to the user I/F 8 so that the display unit of the user I/F 8 displays that information.

Specifically, the first FDC-model unit 12 and the second FDC-model unit 13 issue commands indicating that a defective event previously set as an error is occurring in the semiconductor manufacturing device 2 when an input EES parameter is a certain value or changes in a certain way by using the production management data, the QC-value data, and the EES parameter.

Assuming that the semiconductor manufacturing device 2 is an etching device, and that an abnormality that produces dust occurs in a chamber of the semiconductor manufacturing device 2 if pressure in the chamber during an etching process changes suddenly. In this example, the first FDC-model unit 12 continuously monitors change of pressure in the chamber during the etching process, and, when the amount of change exceeds a threshold level, outputs a warning indicating that an abnormality that causes generation of dust has occurred to the user I/F 8. The user I/F 8 causes the display unit to display the warning.

The management system 200 includes a table 14 and a computer (CPU) 211. The table 14 contains, in an associated manner, data on the first FDC-model unit 12 and events monitored by the first FDC-model unit 12 that are associated with (cause effect on) the first EES parameter, and data on the second FDC-model unit 13 and events monitored by the second FDC-model unit 13 that are associated with (cause effect on) the second EES parameter. The CPU 211 outputs data to the user I/F 8.

The CPU 211 includes an event-data acquiring unit 211a, an event-data determining unit 211b, and an update instructing unit 211c. Specifically, the management system 200 includes the event-data acquiring unit 211a, the event-data determining unit 211b, and the update instructing unit 211c that are realized by executing the CPU 211.

The event-data acquiring unit 211a acquires, as event data, maintenance information of the semiconductor manufacturing device 2 from the maintenance information database 7 and acquires information on a change of the APC set value from the APC-set-value database 10.

The event-data determining unit 211b determines whether the event data acquired by the event-data acquiring unit 211a is associated with one of the first FDC-model unit 12 (or the first EES parameter monitored by the first FDC-model unit 12), the second FDC-model unit 13 (or the second EES parameter monitored by the second FDC-model unit 13), and others based on data in the table 14.

The update instructing unit 211c outputs to the user I/F 8 an instruction for updating the first FDC model as the first error-detection rule when it is determined that the event data acquired by the event-data acquiring unit 211a is associated with the first FDC-model unit 12 (or the first EES parameter monitored by the first FDC-model unit 12). The display unit of the user I/F 8 displays that instruction for the operator.

On the other hand, the update instructing unit 211c outputs to the user I/F 8 an instruction for updating the second FDC model as the second error-detection rule when it is determined that the event data acquired by the event-data acquiring unit 211a is associated with the second FDC-model unit 13 (or the second EES parameter monitored by the second FDC-model unit 13). The display unit of the user I/F 8 displays that instruction for the operator.

Furthermore, when it is determined that the event data acquired by the event-data acquiring unit 211a is associated with the first FDC-model unit 12 (or the first EES parameter monitored by the first FDC-model unit 12), the update instructing unit 211c instructs the first FDC-model unit 12 to automatically update the first FDC model as the first error-detection rule.

Moreover, when it is determined that the event data acquired by the event-data acquiring unit 211a is associated with the second FDC-model unit 13 (or the second EES parameter monitored by the second FDC-model unit 13), the update instructing unit 211c instructs the second FDC-model unit 13 to automatically update the second FDC model as the second error-detection rule.

It is possible to set whether the update instructing unit 211c outputs an instruction for updating the first FDC model to the user I/F 8 for displaying the instruction on the display unit, or the update instructing unit 211c instructs the first FDC-model unit 12 to automatically update the first FDC model, depending on a type of the first EES parameter monitored by the first FDC model. Similarly, it is possible to set whether the update instructing unit 211c outputs an instruction for updating the second FDC model to the user I/F 8 for displaying the instruction on the display unit, or the update instructing unit 211c instructs the second FDC-model unit 13 to automatically update the second FDC model, depending on a type of the second EES parameter monitored by the second FDC model.

FIG. 8 is a flowchart of a process of managing performed by the management system 200 when managing the semiconductor manufacturing device 2. To begin with, the event-data acquiring unit 211a acquires, as event data, maintenance information of the semiconductor manufacturing device 2 and information on change of the APC set value from the maintenance information database 7 and the APC-set-value database 10 (step S21).

The event-data determining unit 211b determines whether the event data acquired by the event-data acquiring unit 211a is associated with the first FDC-model unit 12 (or the first EES parameter monitored by the first FDC-model unit 12), or the second FDC-model unit 13 (or the second EES parameter monitored by the second FDC-model unit 13) based on the data in the table 14 (step S22).

When it is determined that the event data acquired at step S21 is associated with the first FDC-model unit 12 (or the first EES parameter monitored by the first FDC-model unit 12) (Yes at step S23), the update instructing unit 211c determines whether to automatically update the first FDC model based on an associated FDC model determined at step S23 (step S24). Similarly, when it is determined that the event data acquired at step S21 is associated with the second FDC-model unit 13 (or the second EES parameter monitored by the second FDC-model unit 13) (Yes at step S23), the update instructing unit 211c determines whether to automatically update the second FDC model based on an associated FDC model determined at step S23 (step S24).

When it is determined to perform an automatic update (Yes at step S24), process control proceeds to step S25, so that the update instructing unit 211c automatically updates the first or the second FDC model to a corresponding FDC model unit, and outputs to the user I/F 8 data indicating that automatic update has been instructed. Then, process control ends. The display unit of the user I/F 8 displays that data for the operator.

On the other hand, when it is determined not to perform an automatic update (No at step S24), process control proceeds to step S26, so that the update instructing unit 211c outputs to the user I/F 8 data instructing a manual update of the first or the second FDC model. The display unit of the user I/F 8 displays that instruction for the operator. Upon viewing seeing the instruction displayed on the display unit, the operator recognizes a need for manually updating the FDC model, and changes the FDC model as appropriate.

When the update instructing unit 211c determines at step S23 that the acquired event is not associated with either one of the first FDC-model unit 12 (or the first EES parameter monitored by the first FDC-model unit 12) and the second FDC-model unit 13 (or the second EES parameter monitored by the second FDC-model unit 13), process control ends.

As described above, according to the second embodiment, when an event that requires update of the error-detection rule (FDC model) occurs, it is possible to appropriately update a corresponding FDC model and prevent misinformation and overlook of an error.

An example of applying the management method according to the second embodiment is described below. Similar to the first embodiment, the management method is applied to the exposure process of a transistor gate.

FIG. 9 is an example of display of an error detection state for each FDC model on the display unit of the user I/F 8; and FIG. 10 is an example of contents of the table 14 containing event data in association with an FDC model.

As assumed in the first embodiment in connection with FIG. 4, Y-component of the synchronization accuracy is identified as a cause of a resist width error. In other words, dimensional error occurs when Y-component of the synchronization accuracy exceeds a predetermined value.

Assume now that an algorithm is installed in the first FDC-model unit 12 to continuously monitor Y-component of the synchronization accuracy as an FDC model in the exposure process, and when the value of the Y-component of the synchronization accuracy exceeds a previously set threshold, an warning indicative of occurrence of dimensional error is issued.

Similarly, it is assumed that an algorithm is installed in the second FDC-model unit 13 to detect occurrence of a dimensional error when a value of a focus tracking parameter drops below a predetermined value.

An error detection state for each of the first FDC-model unit 12 or the second FDC-model unit 13 is displayed on the display unit of the user I/F 8 in the manner shown in FIG. 9). The level of an error is classified into one of three levels of good (i.e., no attention is required because the corresponding value is within an allowable range), caution needed, and bad (i.e., immediate attention is required because the corresponding value is out of the allowable range), depending on the level of excess from the threshold. A solid black circle is displayed for the appropriate error level. A middle circle between good and bad corresponds to caution needed in the example shown in FIG. 9.

Upon seeing a warning displayed on the display unit of the user I/F 8, the operator determines whether to suspend a production line to perform examination and maintenance. Alternatively, the operator just suspends the production line, i.e., without making a determination as to whether to suspend the production line.

It should be noted that the error-detection rule (FDC model) needs to be reconsidered when a state of the semiconductor manufacturing device 2 changes due to occurrence of an event such as a maintenance operation.

For example, the error-detection rule for the synchronization accuracy needs to be reconsidered and changed when adjustment of a synchronization mechanism between a wafer stage and a reticle stage is performed. Similarly, the error-detection rule for focus tracking needs to be reconsidered and changed when adjustment of a focus system is performed.

If the error-detection rule, i.e., the FDC model, is continuously used without reconsidering, it is possible to cause erroneous detection of an error or overlook of an error.

The event-data acquiring unit 211a acquires event data associated with the semiconductor manufacturing device 2 (step S21 in FIG. 8). The event data contains, for the exposure device, information on change of the APC set value in relation to the light exposure and maintenance information of the exposure device.

The event-data determining unit 211b refers to the event data acquired by the event-data acquiring unit 211a and the table 14, and determines whether there is occurrence of an event associated with a currently working FDC model unit (or the EES parameter monitored by the FDC model or a currently working error-detection rule) (steps S22 and S23 in FIG. 8).

Types of event data associated with each FDC model unit (the EES parameter or the error-detection rule) is stored in the table 14 in the form of the table shown in FIG. 10. It can be seen from FIG. 10 that the first FDC-model unit 12 is associated with the synchronization accuracy, and the second FDC-model unit 13 is associated with the event in relation to a focus.

For example, the event-data acquiring unit 211a detects that an event of a maintenance operation has occurred at time t3 shown in FIG. 3A, and recognizes that the event is associated with a focus due to the fact that the maintenance operation is an adjustment of a focus system. The event-data determining unit 211b determines that the second FDC-model unit 13 that is detecting the dimensional error by using the follow focus parameter (EES parameter) corresponds to the event on a focus from the table shown in FIG. 10.

Upon receiving a determination result from the event-data determining unit 211b, the update instructing unit 211c outputs an update instruction. For example, the update instructing unit 211c sends the update instruction indicative of a fact that an update of the error-detection rule (FDC model) is required to the user I/F 8, and the display unit of the user I/F 8 displays the update instruction for the operator in the manner shown in FIG. 9. At this point, if the update type is specified as a manual update in the table shown in FIG. 10, the update instructing unit 211c refers to that table and displays that "suspended, need manual update" on the display unit of the user I/F 8. At the same time, the update instructing unit 211c instructs the target FDC model unit (in the example shown in FIG. 10, the second FDC-model unit 13) to suspend operation of the target FDC model (step S26 in FIG. 8). There is no indication on any one of good, caution needed, and bad for the second FDC-model unit 13 as shown in FIG. 9; because, the second FDC-model unit 13 is suspended.

Upon receiving an instruction to suspend, the FDC model unit ends an error determination process. The operator recognizes an instruction displayed on the display unit as shown in FIG. 9, and manually updates the target error-detection rule (FDC model). For the event at time t3 shown in FIG. 3A, the operator checks change of the follow focus parameter after maintenance of the focus system, and sets a determination condition suitable for detecting a dimensional error as a new error-detection rule (FDC model) to the second FDC-model unit 13.

On the other hand, when the type of an update is set as an automatic update in the table shown in FIG. 10, the update instructing unit 211c displays "update needed, automatically updating" instead of "suspended, need manual update" on the screen shown in FIG. 9, and issues instruction indicative of an automatic update to the target FDC model unit (steps S24 and S25 in FIG. 8). The FDC model unit that received the instruction updates the error-detection rule in accordance with the previously installed algorithm.

For example, upon receiving the instruction for updating, the first FDC-model unit 12 suspends the error detection process, and automatically sets a threshold suitable for detecting the dimensional error based on a relation between Y-component of the synchronization accuracy and the resist width by using data for ten lots (i.e., automatically updates the error-detection rule). After completion of the setting, the first FDC-model unit 12 restarts the error detection process.

The update instruction unit 211c deletes a corresponding displayed data indicating an update state from displayed on the display unit (see FIG. 8) after the manual or the automatic update is completed.

As described above, according to the second embodiment, event data is acquired, and a corresponding error-detection rule (FDC model) can be appropriately updated when it is needed in accordance with a change in the state of the device due to occurrence of an event. Thus, it is possible to prevent erroneous information, an erroneous detection, and overlook of an error.

Specifically, it is possible to effectively use the error-detection rule (FDC model) in accordance with a change in state of the device due to occurrence of an event. Therefore, an error can be detected in accordance with the APC control and the maintenance. As similar to the first embodiment, the error-detection rule (FDC model) is updated in accordance with a change of a state of the device due to occurrence of an event. Thus, such an update is performed between events.

Although it is explained that the two FDC model units are arranged in the management system 200 (i.e., the first FDC-model unit 12 and the second FDC-model unit 13), it is possible to arrange three or more of the FDC model units depending on the number of EES parameters to be monitored.

A third embodiment of the present invention is described with reference to FIGS. 11 to 14. As the third embodiment, an exposure-device parameter that changes the resist width is taken as an example, and an FDC model as the error-detection rule is configured based on those parameters. The exposure-device parameters are the same as those described in the first and the second embodiments.

The following examination was performed as assumption of the third embodiment: the management system having the same configuration as that in the first embodiment was operated for one year; a plurality of the exposure parameters that change a value of resist width were extracted; and those extracted parameters were further examined for their relation to the resist width.

Examples of the exposure-device parameters include synchronization accuracy, orthogonality of a wafer, shot magnification, delay in processing after a developing process as will be described in detail. Other extracted exposure-device parameters are just listed in addition to the above parameters. Correlation between the exposure-device parameter and the resist width has not been recognized in the conventional techniques, while such a correlation was recognized with the management system 100.

The synchronization accuracy is explained below. As a result of operation of the management system 100, it can be seen that there is a correlation between a mean of standard deviation of Y-component of the synchronization accuracy and a distribution width of a first distribution layer. The synchronization accuracy is associated with a follow (synchronization) accuracy between a wafer stage and a reticle stage, i.e., associated with Y component of the synchronization accuracy from X component and Y component set on the surface of the wafer stage. The synchronization accuracy is a mean of standard deviation of Y-component of the synchronization accuracy. The mean of the standard deviation of Y-component of the synchronization accuracy is obtained as follows: there is a fact that the exposure process to a single wafer is separated into a plurality of shot exposure; a predetermined number of the shot exposure is put into a group; standard deviation of Y-component of the synchronization accuracy for each group is calculated; and a mean of obtained standard deviation is calculated for the wafer.

Although Y-component of the synchronization accuracy is described below, X-component is similar to the Y-component, so that a mean of the standard deviation of the X-component of the synchronization accuracy can be used as the exposure-device parameter.

Figure 11:
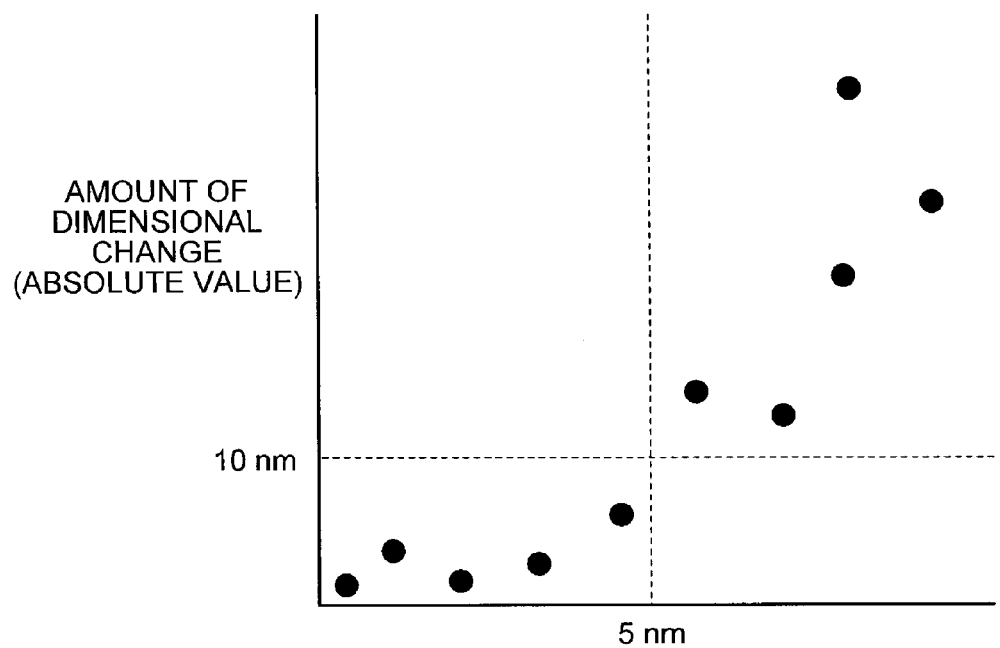
FIG. 11 is a scatter plot of a relation between mean of standard deviation of Y-component of synchronization accuracy and amount of dimensional change (absolute value)

In the actually-examined exposure process, a target value of a distribution width of a first distribution layer is 150 nanometers, while an allowable range in design is from 140 nanometers to 160 nanometers. FIG. 11 is a scatter plot of a relation between a mean of standard deviation of Y-component of the synchronization accuracy and an amount of dimensional change (absolute value). The amount of dimensional change (absolute value) means an absolute value of amount of change from the target value of the distribution width. Each point is plotted for each wafer on the scatter plot. It can be seen from FIG. 11 that as a mean of the standard deviation of Y-component of the synchronization accuracy increases, a difference between the amount of dimensional change (absolute amount) and the target value increases. When the mean of the standard deviation of Y-component of the synchronization accuracy exceeds 5 nanometers, the amount of dimensional change (absolute amount) exceeds 10 nanometers, exceeding the allowable range in design.

A management system according to the third embodiment is provided with a third FDC model and a third FDC model unit in addition to the configuration of the management system 200. The third FDC model issues a warning when the mean of the standard deviation of Y-component of the synchronization accuracy exceeds 5 nanometers. The third FDC model unit is such that in which the third FDC model is installed. Upon receiving the mean of the standard deviation of Y-component of the synchronization accuracy, the third FDC model detects an error that causes the distribution width of the first distribution layer to be changed equal to or more than 10 nanometers. At the same time, an instruction is issued to the operator to perform maintenance of the wafer stage and the reticle stage based on the parameter of the exposure device used for error detection (i.e., the mean of the standard deviation of Y-component of the synchronization accuracy). Specifically, a maintenance instruction is displayed on the display unit of the user I/F 8, and the operator conducts maintenance in accordance with the displayed instruction. The synchronization accuracy is registered as event data associated with the third FDC model.

As shown in FIG. 10, the first FDC model is explained as an FDC model in relation to the synchronization accuracy according to the second embodiment. However, for detailed explanation of such an FDC model in distinction from the first FDC model, the third FDC model is employed in the third embodiment.

As another example of the extracted exposure-device parameter, the orthogonality of a wafer is described below. As a result of an operation of the management system 100, it can be seen that there is a correlation between the orthogonality of a wafer and a gate dimension. The orthogonality of a wafer means a mean of orthogonality measured per shot of exposure to a wafer.

Figure 12:
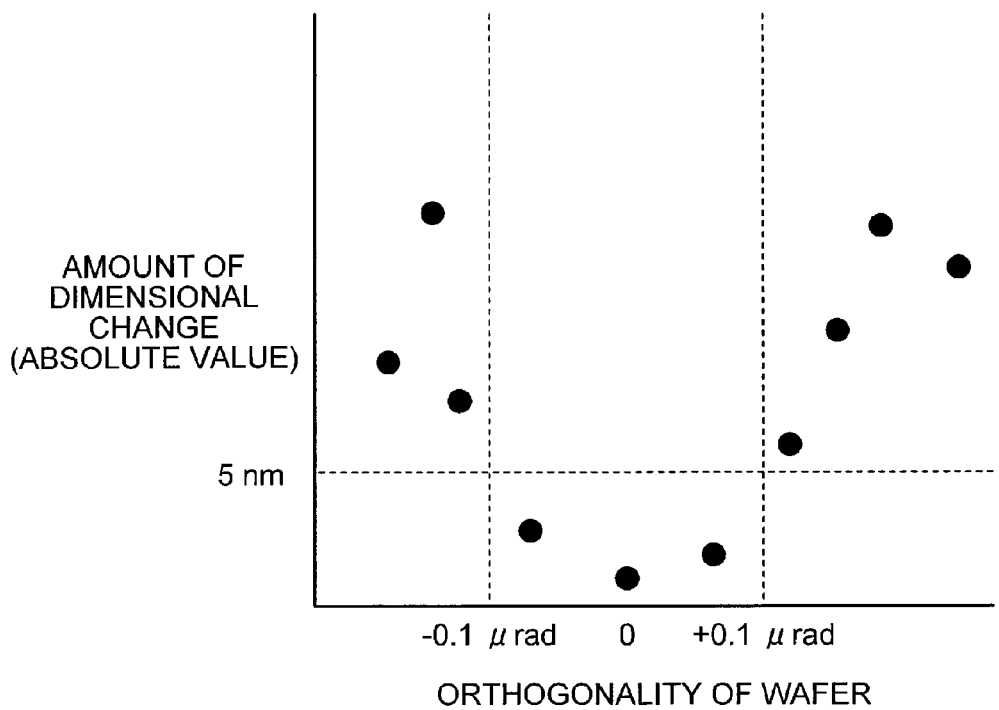
FIG. 12 is a scatter plot of a relation between amount of dimensional change (absolute value) and orthogonality of a wafer.

In the actually-operated exposure process, the target value of the gate dimension is 100 nanometers, while allowable range in design is from 95 nanometers to 105 nanometers. FIG. 12 is a scatter plot of a relation between an amount of dimensional change (absolute value) and orthogonality of a wafer. Each point in the scatter plot corresponds to a separate wafer. As the orthogonality of a wafer increases/decreases from zero, amount of dimensional change increases. When the absolute value of the orthogonality of a wafer exceeds 0.1 microradian (μrad), the amount of dimensional change (absolute value) exceeds 5 nanometers, so that the gate dimension exceeds the allowable range.

A fourth FDC model that issues a warning when the absolute value of the orthogonality of a wafer exceeds 0.1 microradian is prepared. Moreover, a fourth FDC model unit in which the fourth FDC model is installed is arranged in the configuration of the management system according to the third embodiment. Upon receiving the orthogonality of a wafer, the fourth FDC model detects an error that causes the gate dimension to be changed equal to or more than 5 nanometers from the target value. At the same time, an instruction is issued to an operator to perform maintenance of the wafer stage based on the parameter of the exposure device used for detection (i.e., the orthogonality of a wafer). Specifically, a maintenance instruction is displayed on the display unit of the user I/F 8, and the operator conducts the maintenance in accordance with the displayed instruction. An "adjustment" is registered as event data associated with the fourth FDC model.

As a still another example of the extracted exposure-device parameter, shot magnification and delay in processing after a developing process are explained below. As a result of operation of the management system 100, it can be seen that there is a correlation between the shot magnification, the delay in processing after a developing process, and the gate dimension. The shot magnification is a relative magnification of a reticle image in the exposure process. The delay in processing after a developing process means delay from a time when a predetermined developing process is finished to a time when a wafer is actually discharged from a developing unit, in a resist developing process to the wafer after the exposure process. The resist developing process and the exposure process are integrally explained as the exposure process; because the resist developing process is performed right after the exposure process and each processing device is integrally arranged with each other.

The correlation between the shot magnification and the delay in processing after a developing process and the dimensional change is not clear. However, as shown in FIG. 13, if X-coordinate defines the delay in processing after a developing process, Y-coordinate defines the shot magnification, and contour is depicted in accordance with an absolute value of an amount of change from the target value of the gate dimension, a certain correlation can be seen. The absolute value of the amount of change from the target value of the gate dimension represents dimensional change, representing each of curved lines with dimensional change of 1 nanometer, 3 nanometers, and 5 nanometers. It can be seen from FIG. 13 that, when the delay in processing after a developing process exceeds 10 seconds or more, and the shot magnification becomes equal to or larger than 0.1 parts per million, the gate dimension exceeds the allowable range in design.

A two-variable function is provided that presumes an absolute value of the amount of change from the target value of the gate dimension based on the delay in processing after a developing process and the shot magnification. A fifth FDC model using the two-variable function is prepared to issue a warning when detecting the dimensional change of equal to or more than 5 nanometers from the allowable range of the gate dimension. A fifth FDC model unit in which the fifth FDC model is installed is also arranged in the configuration of the management system according to the third embodiment. As described above, upon receiving the shot magnification and the delay in processing after a developing process, the fifth FDC model detects an error that causes the gate dimension to be changed equal to or more than 5 nanometers from the target value. At the same time, an instruction is issued to an operator so that maintenance of an optical stage and a developing unit is conducted based on the parameter of the exposure device used for an error detection (i.e., the shot magnification and the delay in processing after a developing process). Specifically, a maintenance instruction is displayed on the display unit of the user I/F 8, and the operator conducts the maintenance in accordance with a displayed instruction. An "adjustment" and a clean track serving as a unit for resist coating, baking, and developing process are registered as event data associated with the fifth FDC model.

As the two-variable function used in the fifth FDC model, multivariate function such as Mahalanobis distance can be used. As a method of extracting the exposure-device parameter associated with the dimensional change, a univariate correlation analysis is used in the first embodiment, while the two-variable function using the shot magnification and the delay in processing after a developing process is used in the third embodiment. However, it is possible to use the PLS analysis or the principal component analysis instead of the correlation analysis using a correlation coefficient.

FIG. 14 depicts examples of the third to the fifth FDC models. As a result of operation in the exposure process performed by the management system 100, other exposure parameters causing change of the resist width are extracted. The exposure-device parameters associated with the third to the fifth FDC models and the other exposure-device parameters are the following:

(1) Parameter indicative of synchronization accuracy between a wafer stage and a reticle stage (synchronization accuracy, mean, standard deviation)

(2) Parameter indicative of difference between a target value and an actually-measured value of a focus position (follow focus, mean, standard deviation)

(3) Parameter indicative of difference between a target value and an actually-measured value of a tilt amount (tilt to Z-axis, mean, standard deviation)

(4) Parameter associated with alignment (parallel movement, rotation, magnification, orthogonality)

(5) Parameter associated with resist coating, baking, and developing (temperature, flow rate, processing time)

In the above example, the third FDC model is classified into (1), the orthogonality of a wafer is (4), the shot magnification is (4), and the delay in processing after a developing process is (5). The description "synchronization accuracy, mean, standard deviation" added to the parameter (1) indicates that a mean, standard deviation, and a mean of the standard deviation for the parameter are also used as parameters in addition to the synchronization accuracy. This is the same for the parameters (2) and (3). The parameter (2) indicates follow property of a focus position in a projection optical system. The parameter (3) indicates the level of tilt to Z-axis orthogonal to the surface of the wafer stage; for example, tilt amount of an optical axis. The parameter (4) is associated with alignment of a reticle and a wafer, indicating parallel movement, rotation, magnification, orthogonality. The parameter (5) is associated with the exposure process, such as resist coating, baking, and temperature, flow rate, and processing time in a developing process.

As described in the third embodiment, an FDC model is prepared by examining relation between the exposure-device parameter and a value of target parameter, and obtaining a detection rule for detecting when the target parameter exceeds the allowable range in design.

The event data is also registered in association with the arranged FDC model. By installing such FDC models in the management system according to the second embodiment, it is possible to automatically issue an update instruction for the FDC model when an event requiring an update of the FDC model occurs.

As described above, according to the third embodiment, the exposure-device parameter as the cause of change of the target parameter is extracted, and an FDC model is arranged in which a detection rule for detecting a situation where the target parameter exceeds the allowable range in design. Therefore, an error in target parameter can be detected and maintenance instruction can be automatically issued depending on the cause of the error. Examples of the detection rule include a management value of each of the exposure-device parameters with which the target parameter is within the predetermine range, and a univariate/multivariate detection function.

It is effective to stabilize a target parameter in a predetermined range during the exposure process for improving productivity of the semiconductor devices. In the conventional technique, dimensional change is adjusted by using a relatively easy parameter such as adjustment of light exposure. Thus, true cause of variation in a device is left as it is without taking a countermeasure, resulting in causing the same error. However, cause of variation can be extracted as described in the first embodiment, and target parameter can be stably set in a predetermined range by installing an FDC model in relation to an extracted exposure-device parameter as described in the second embodiment.

As set forth hereinabove, according to an aspect of the present invention, it is possible to extract a cause of variation of the QC values excluding cause of variation due to events such as an APC control or a maintenance. Thus, an error such as a defective state of the semiconductor manufacturing device can be detected in the semiconductor-device manufacturing process.

Furthermore, it is possible to use an error-detection rule in accordance with a change of a state of a device due to events such as the APC control or a maintenance operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A management system that manages a semiconductor manufacturing device, the management system comprising:
   a first storage unit that stores therein a plurality of quality-control values, the quality-control values being values obtained by measuring a dimension of individual wafers at different times during processing of the wafers by the semiconductor manufacturing device;
   a second storage unit that stores therein a plurality of equipment parameters, the equipment parameters being values obtained by monitoring a state of the semiconductor manufacturing device at different times during processing of the wafers by the semiconductor manufacturing device;
   a third storage unit that stores therein a maintenance log of the semiconductor manufacturing device;
   a first setting unit that sets a correction value for correcting the equipment parameters to control the quality-control values based on the quality-control values in the first storage unit and the equipment parameters in the second storage unit;

a fourth storage unit that stores therein the correction value set by the first setting unit;

a second setting unit that sets a variable period in which the quality-control values vary;

a retrieving unit that retrieves events sandwiching the variable period, the events including a maintenance of the semiconductor manufacturing device from the maintenance log stored in the third storage unit and a change of the correction value in the fourth storage unit;

a third setting unit that sets an analysis period for analyzing a cause of variation of the quality-control values between the events retrieved by the retrieving unit; and an extracting unit that performs statistical analysis to quantitatively calculate a correlation between quality-control values and equipment parameters within the analysis period, and extracts a cause of variation of the quality-control values based on calculated correlation.

2. A method of managing a semiconductor manufacturing device, the method comprising:

setting a variable period in which quality-control values vary, the quality-control values being values obtained by measuring a dimension of individual wafers at different times during processing of the wafers by the semiconductor manufacturing device;

retrieving events sandwiching the variable period, the events including a maintenance of the semiconductor manufacturing device and a change of a correction value, the correction value being a value for correcting equipment parameters to control the quality-control values based on the quality-control values, the equipment parameters being values obtained by monitoring a state of the semiconductor manufacturing device at different times during processing of the wafers by the semiconductor manufacturing device;

setting an analysis period for analyzing a cause of variation of the quality-control values between the events retrieved at the retrieving;

performing statistical analysis to quantitatively calculate a correlation between quality-control values and equipment parameters within the analysis period; and extracting a cause of variation of the quality-control values based on the correlation calculated at the performing.

* * * * *